(12) United States Patent
Kobayashi et al.

(10) Patent No.: US 8,511,834 B2
(45) Date of Patent: Aug. 20, 2013

(54) PROJECTION TYPE DISPLAY APPARATUS

(75) Inventors: Yukihiro Kobayashi, Fujisawa (JP);
Takeshi Katayama, Yokohama (JP);
Hiroyuki Inoue, Fujisawa (JP); Shigeki Hoshino, Yashio (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 403 days.

(21) Appl. No.: 12/814,323

(22) Filed: Jun. 11, 2010

(65) Prior Publication Data

US 2011/0051098 A1  Mar. 3, 2011

(30) Foreign Application Priority Data

Aug. 28, 2009  (JP) .................. 2009-197586

(51) Int. Cl.
*G03B 21/18* (2006.01)
*G03B 21/16* (2006.01)
*B60Q 1/06* (2006.01)
*F21V 29/00* (2006.01)

(52) U.S. Cl.
USPC .......................................... 353/61; 362/373

(58) Field of Classification Search
USPC .................. 353/57, 58, 60, 61, 62, 119, 122; 49/104, 142, 143, 144, 145, 150, 164; 362/294, 362/345, 373
See application file for complete search history.

(56) References Cited

U.S. PATENT DOCUMENTS

| 7,179,048 B2 * | 2/2007 | Huang et al. | 415/126 |
| 2003/0076683 A1 * | 4/2003 | Chang | 362/294 |
| 2005/0151937 A1 * | 7/2005 | Sugitani | 353/85 |
| 2008/0246896 A1 * | 10/2008 | Zheng et al. | 349/5 |

FOREIGN PATENT DOCUMENTS

| JP | 10-106307 A | 4/1998 |
| JP | 2005-010505 | 1/2005 |
| JP | 2005-024735 | 1/2005 |
| JP | 2005-249930 | 9/2005 |
| JP | 2006-091132 | 4/2006 |
| JP | 2009099269 A * | 5/2009 |

* cited by examiner

*Primary Examiner* — William C Dowling
*Assistant Examiner* — Ryan Howard
(74) *Attorney, Agent, or Firm* — Kilpatrick Townsend & Stockton LLP

(57) ABSTRACT

A projection type display apparatus in accordance with the present invention is provided with a lamp unit including a light source, a cooling fan cooling the light source, and a cooling wind guide tube guiding a cooling wind generated by the cooling fan to the lamp unit, and the cooling wind guide tube is structured such as to have a movable type rectification plate which is movable by its own weight, and cools the light source without being affected by an installed direction of the projection type display apparatus.

10 Claims, 9 Drawing Sheets

19

OPPOSITE DIRECTION TO GRAVITATIONAL FORCE AT A TIME OF FLOOR PLACED INSTALLATION

GRAVITATIONAL DIRECTION AT A TIME OF CEILING SUSPENDED INSTALLATION

GRAVITATIONAL DIRECTION AT A TIME OF FLOOR PLACED INSTALLATION

OPPOSITE DIRECTION TO GRAVITATIONAL FORCE AT A TIME OF CEILING SUSPENDED INSTALLATION

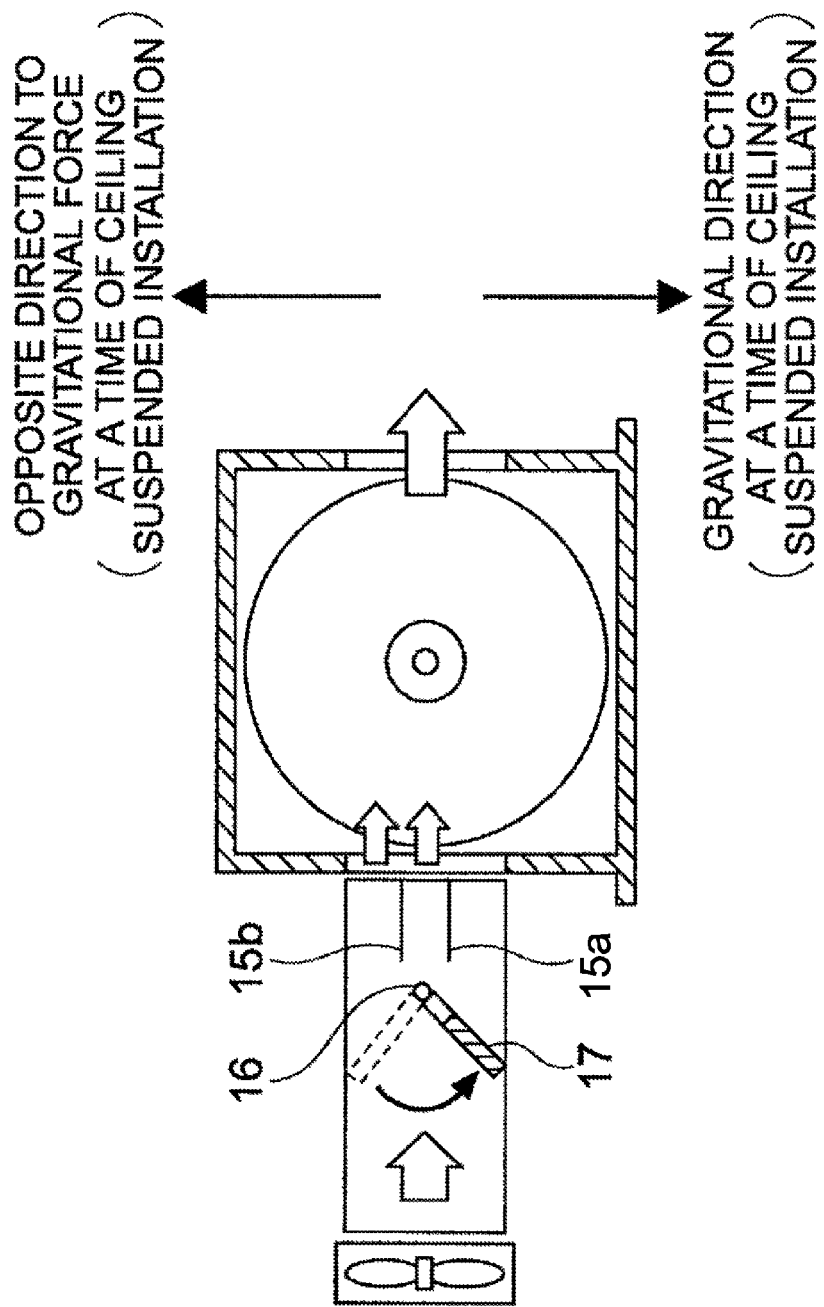

FIG. 8

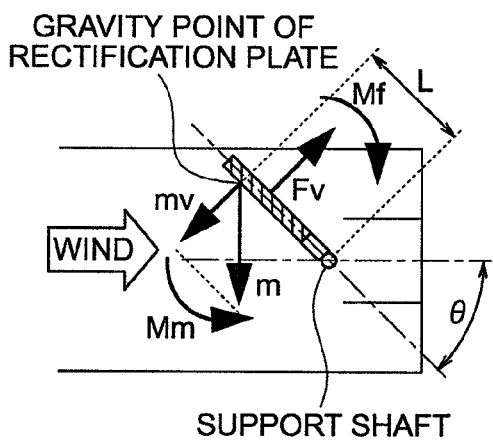

GRAVITY POINT OF RECTIFICATION PLATE

SUPPORT SHAFT

L: DISTANCE FROM SUPPORT SHAFT TO GRAVITY POINT
m: GRAVITATIONAL FORCE APPLIED TO GRAVITY POINT
mv: VERTICAL COMPONENT TO RECTIFICATION PLATE OF GRAVITATIONAL FORCE ($mv = m \cdot \cos\theta$)
Mm: MOMENT CAUSED BY GRAVITATIONAL FORCE ($Mm = mv \cdot L$)
Fv: VERTICAL COMPONENT TO RECTIFICATION PLATE OF COOLING WIND PRESSURE
Mf: MOMENT CAUSED BY COOLING WIND PRESSURE ($Mf = f(Fv)$)  $f(Fv)$ IS CAUSED BY OPENING SHAPE
$\theta$: ANGLE OF RECTIFICATION PLATE

PROJECTION TYPE DISPLAY APPARATUS

CROSS-REFERENCE TO RELATED APPLICATION

This application claims priority from Japanese Patent Application JP 2009-197586, filed on Aug. 28, 2009, the content of which is hereby incorporated by reference into this application.

BACKGROUND OF THE INVENTION (1) Field of the Invention

The present invention relates to a projection type display apparatus projection displaying an image.

(2) Description of Related Art

JP-A-10-106307 discloses in its paragraphs [0008] and [0009] a light source apparatus "comprising a lamp housing having a light projecting surface which is open in one surface, supporting a lamp in an inner portion and having an attached attitude selected in a vertical direction; a cooling fan arranged so as to be opposed to a side surface of the lamp housing; and a wind guide direction changing portion always guiding a wind heading for an interior side of the lamp housing from the cooling fan upward regardless of the selection of the attached attitude of the lamp housing, wherein the wind guide direction changing portion is formed by opening portions formed in an upper portion and a lower portion of the side surface of the lamp housing, and a shutter selecting an opening region of the opening portions".

BRIEF SUMMARY OF THE INVENTION

In the technique disclosed in JP-A-10-106307, since a mechanism guiding the cooling wind is installed in a lamp casing holding a discharge lamp, the lamp casing comes to a complicated structure, thereby causing a cost increase.

In order to solve the problem mentioned above, in accordance with an aspect of the present invention, there is provided a projection type display apparatus comprising:
a lamp unit including a light source;
a cooling fan cooling the light source; and
a cooling wind guide tube guiding a cooling wind generated by the cooling fan to the lamp unit,
wherein the cooling wind guide tube has three divided flow paths, and the cooling wind is guided by two adjacent flow paths.

Further, in accordance with the other aspect of the present invention, there is provided a projection type display apparatus comprising:
a lamp unit including a light source;
a cooling fan cooling the light source; and
a cooling wind guide tube guiding a cooling wind generated by the cooling fan to the lamp unit,
wherein the cooling wind guide tube has a movable type rectification plate which is movable by its own weight, and
wherein the movable type rectification plate rotates by its own weight around a support shaft which does not pass through a gravity point of the movable type rectification plate.

In the projection type display apparatus in accordance with the present invention, it is preferable that the movable type rectification plate has an opening portion in the support shaft side.

Further, in the projection type display apparatus in accordance with the present invention, it is preferable that the movable type rectification plate is retained by the support shaft and a wall surface of the cooling wind guide tube after rotating by its own weight.

Further, in the projection type display apparatus in accordance with the present invention, it is preferable that the movable type rectification plate comes into contact with a wall surface of the cooling wind guide tube in an upstream side of the support shaft, after rotating by its own weight.

Further, in the projection type display apparatus in accordance with the present invention, it is preferable that the cooling wind guide tube has a fixed rectification plate dividing a flow path of the cooling wind, and the fixed rectification plate is installed in a downstream side of the movable type rectification plate.

Further, in the projection type display apparatus in accordance with the present invention, it is preferable that the movable type rectification plate is structured such that a portion which is away from the support shaft is folded back toward the support shaft.

Further, in the projection type display apparatus in accordance with the present invention, it is preferable that the movable type rectification plate is structured such that a portion which is away from the support shaft is thicker than a portion which is close to the support shaft.

Further, in the projection type display apparatus in accordance with the present invention, it is preferable that the movable type rectification plate is structured such that a specific gravity of a material constructing a portion which is away from the support shaft is larger than a specific gravity of a material constructing a portion which is close to the support shaft.

Further, in the projection type display apparatus in accordance with the present invention, it is preferable that the fixed rectification plate is constructed by a rectification plate dividing the flow path of the cooling wind into three sections including an upper stage, a middle stage and a lower stage, and a gas volume of the cooling wind passing through two flow paths in an opposite direction side to a gravitational force is relatively more than a gas amount of the cooling wind passing through one flow path in a gravitational direction, in the flow paths divided by the fixed rectification plate.

Further, in the projection type display apparatus in accordance with the present invention, it is preferable that the movable type rectification plate is supported in such a manner as to be slidable in a gravitational direction by its own weight.

In accordance with further the other aspect of the present invention, there is provided a projection type display apparatus comprising:
a lamp unit including a light source;
a cooling fan cooling the light source; and
a cooling wind guide tube guiding a cooling wind generated by the cooling fan to the lamp unit,
wherein the cooling wind guide tube has a movable type rectification plate which is movable by its own weight, and
wherein the movable type rectification plate is positioned at an end in a gravitational direction of a movable range, on the basis of the movement by its own weight, in any installed state of a floor placed installation and a ceiling suspended installation of the projection type display apparatus.

EFFECT OF THE INVENTION

In accordance with the present invention, it is possible to preferably cool the light source of the projection type display apparatus.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 7 is a schematic view of a state in which the projection type display apparatus in accordance with the embodiment 1 is installed in accordance with a ceiling suspended installation;

FIG. 8 is an explanatory view of a rotating condition on the basis of its own weight of a movable type rectification plate in accordance with the embodiments 1 and 2;

DETAILED DESCRIPTION OF THE INVENTION

A description will be in detail given below of embodiments in accordance with the present invention with reference to the accompanying drawings.

Embodiment 1

A projection type display apparatus is an apparatus which condenses by using a condensing device such as a lens or the like, forms an image by transmitting light through a display element such as a liquid crystal panel or the like, and projects the image to an outer portion via a projection lens.

Figure 1A:
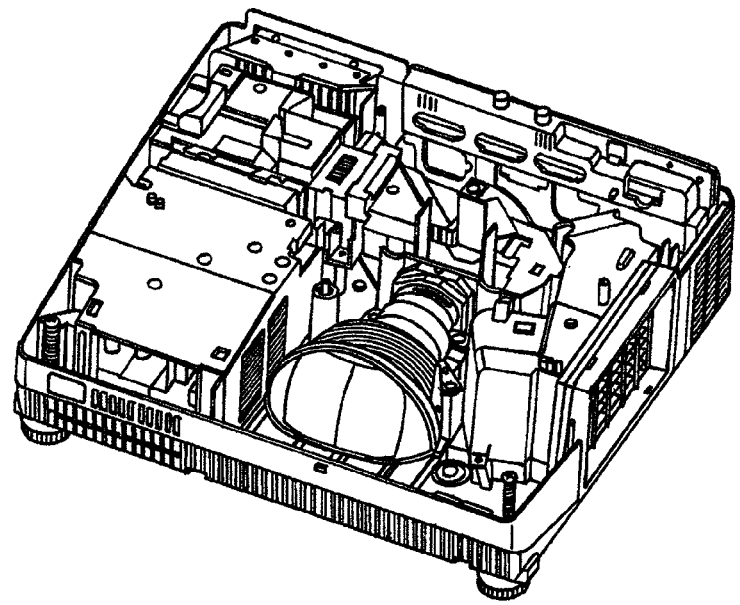
FIG. 1A is a view of a whole structure of a projection type display apparatus in accordance with embodiments 1, 2 and 3.
Figure 1B:
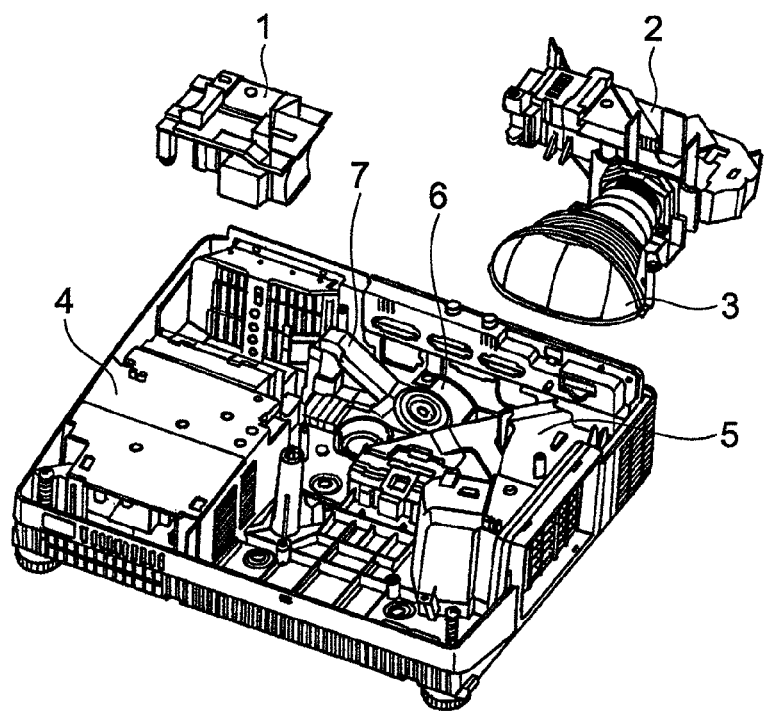
FIG. 1B is a separation view of the projection type display apparatus in accordance with the embodiments.

FIGS. 1A and 1B is a view of a whole structure of the projection type display apparatus in accordance with the present embodiment, and a view showing a state in which each of components is separated from the whole structure view.

The projection type display apparatus in accordance with the present embodiment is constructed by a lamp unit 1 including a light source, an optical engine 2 generating an image, a projection lens 3 projecting the image, a power supply unit 4, a panel duct 5, a cooling fan 6, a lamp duct 7 and the like.

In this case, it is often the case that a discharge lamp such as a high pressure mercury lamp or the like is used as the light source of the projection type display apparatus. In the present embodiment, a description will be given on the assumption that the light source is constructed by the discharge lamp such as the high pressure mercury lamp or the like, however, the other light sources may be used.

Figure 2:
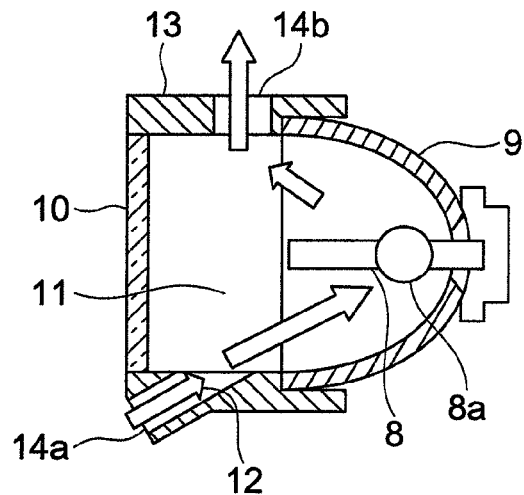
FIG. 2 is a horizontal cross sectional schematic view of a lamp unit in accordance with the embodiments 1, 2 and 3.
Figure 3:
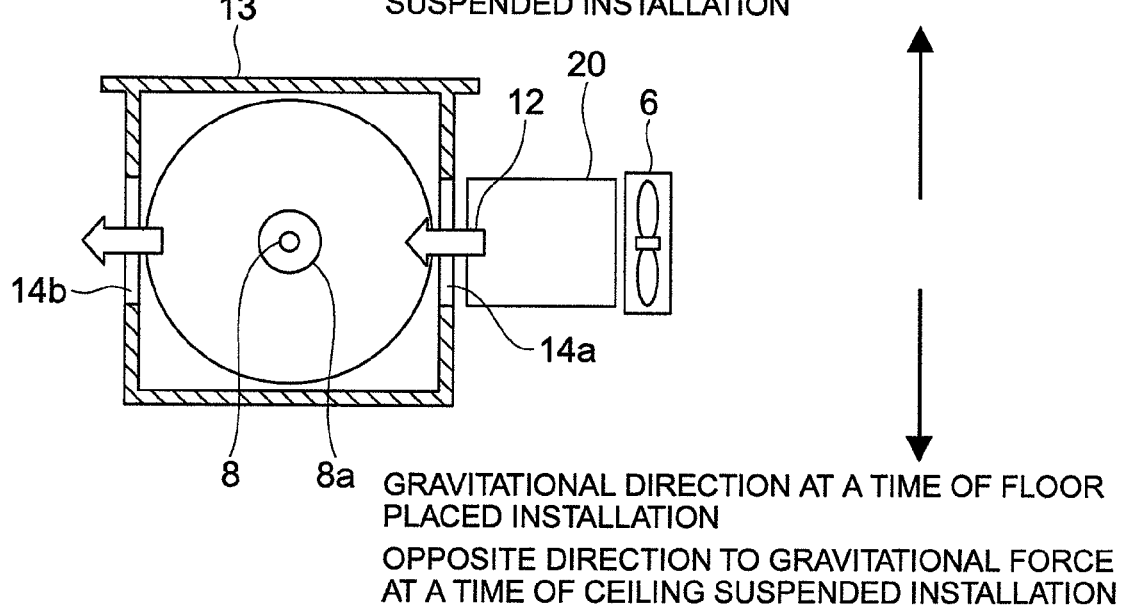
FIG. 3 is a front elevational schematic view of the lamp unit in accordance with the embodiments 1, 2 and 3.

FIG. 2 is a schematic view of a horizontal cross section of the lamp unit 1 in accordance with the present embodiment, and FIG. 3 is a schematic view of a front face.

The discharge lamp 8 has a great used electric power. Further, the discharge lamp 8 is arranged within a space 11 which is surrounded by a reflector 9 and an explosion proof glass 10. Accordingly, it comes to a very high temperature, for example, about 1050° C. At this time, a short time of a service lift is caused by getting on with use beyond a proper temperature. Therefore, it is necessary to carry out a forced air cooling by a fan in order to decrease the temperature of the discharge lamp 8. In the present embodiment, the discharge lamp 8 is cooled by applying the cooling wind to an outer shell surface of the reflector 9 by a cooling fan (not shown) and guiding a cooling wind 12 into the space 11 in which the discharge lamp 8 is arranged.

The explosion proof glass 10 is provided for preventing fragments from flying in all directions at a time when the discharge lamp 8 bursts, and is fixed to a lamp fixing casing 13 by an adhesive agent, a spring or the like which is not illustrated. The lamp fixing casing 13 is provided with an opening portion 14a coming to an inflow port guiding the cooling wind into the space 11, and is provided with an opening portion 14b coming to an outflow port in an opposite side, and the cooling wind flowing into from the opening portion 14a is exhausted from the opening portion 14b provided in the opposite side after cooling a light emitting portion 8a of the discharge lamp 8.

In this case, a mesh-shaped metal gauze is provided, for example, in an opening portion, in each of the opening portions 14a and 14b provided in the lamp fixing casing 13, and prevents the fragments from flying in all directions at a time when the discharge lamp 8 bursts.

Since the lamp fixing casing 13 comes into direct contact with the reflector 9 coming to a high temperature, a material of the lamp fixing casing 13 employs a polyphenylene sulfide (PPS) material having a high heat resistance and having a heat resisting temperature of about 250° C. Since the PPS material has a high material cost, and is hard to be molded, a total cost thereof becomes high. Accordingly, it is preferable to make used positions as little as possible. In the present embodiment, since the lamp fixing casing 13 is provided with the opening portions 14a and 14b coming to the cooling wind flow paths, it is possible to reduce a used amount of the PPS material in the fixing portion, and it is possible to hold down a cost rise.

In this case, the projection type display apparatus generally has a floor placed installation in which it is horizontally installed on a desk and is projected upward diagonally, and a ceiling suspended installation in which it is suspended to a ceiling and is projected downward diagonally.

Figure 4A:
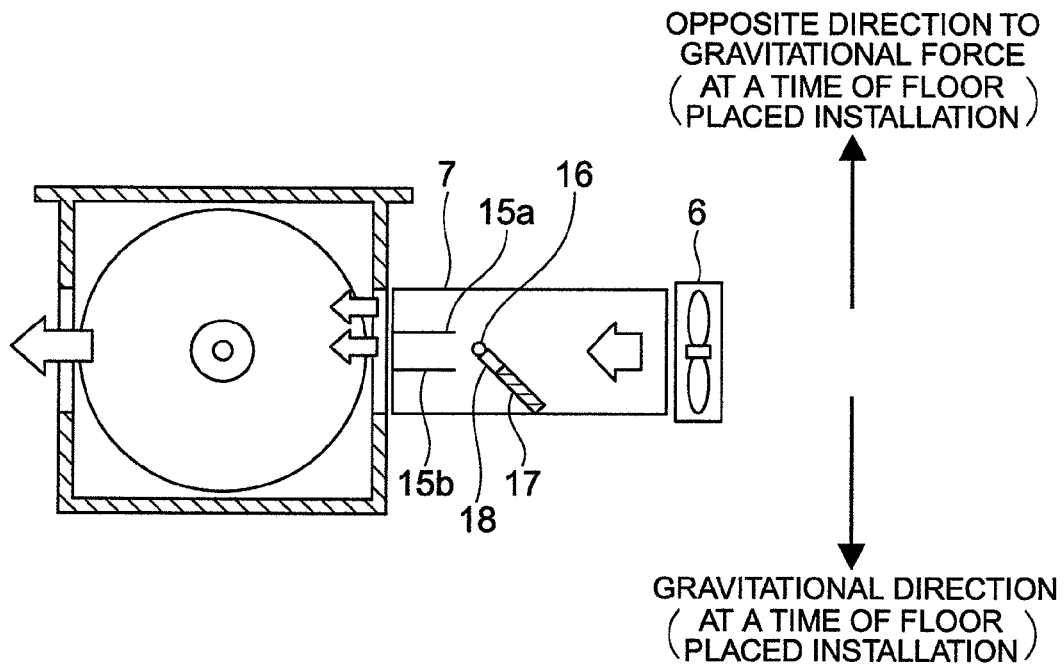
FIG. 4A is a schematic view of a state in which the projection type display apparatus in accordance with the embodiment 1 is placed in accordance with a floor placed installation.
Figure 4B:
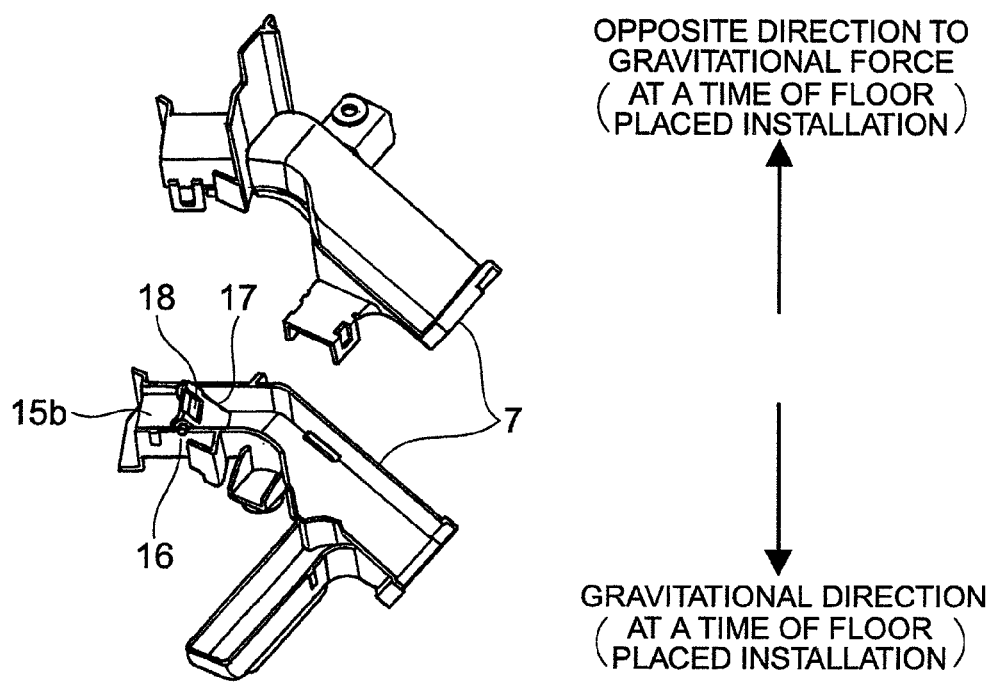
FIG. 4B is a perspective view of a state in which the projection type display apparatus in accordance with the embodiment 1 is placed in accordance with a floor placed installation.

FIGS. 4A and 4B are views showing a state in the case that the projection type display apparatus in accordance with the present embodiment is installed in accordance with the floor placed installation. In this case, FIG. 4A is a view schematically explaining the present embodiment, and FIG. 4B is a view showing a structure of the present embodiment.

A blow-off port for the cooling wind in the lamp duct 7 has fixed rectification plates 15a and 15b dividing the flow path of the cooling wind into an upper stage, a middle stage and a lower stage in a vertical direction. Further, an upstream side of the rectification plates 15a and 15b fixed to the lamp duct 7 has a rotatable movable type rectification plate 17 which is supported by a support shaft 16 positioned in the center of the duct. Details of the movable type rectification plate 17 will be mentioned below.

More cooling wind passes through two flow paths in an opposite direction side to a gravitational force relatively in comparison with one flow path in a gravitational direction, in the flow paths which are divided into three sections by the fixed rectification plates 15a and 15b, by means of the movable type rectification plate 17. Since the discharge lamp 8 used in the projection type display apparatus comes to a high temperature particularly in the opposite direction side to the gravitational force in the light emitting portion, it is necessary to concentrically cool this portion.

In this case, the following effect can be obtained by dividing the flow path of the cooling wind into three sections by the fixed rectification plates 15a and 15b.

It is possible to cool different positions of the discharge lamp per divided flow paths.

Figure 5A:
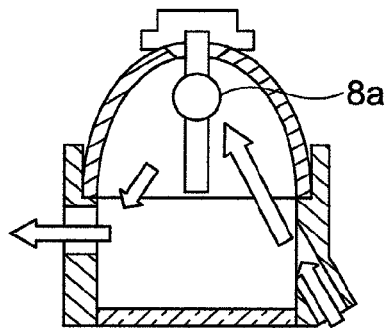
FIG. 5A is a horizontal cross sectional schematic view of the lamp unit and shows a flow of a cooling wind passing through flow paths in an upper stage and a lower stage, in the embodiments 1, 2 and 3.
Figure 5B:
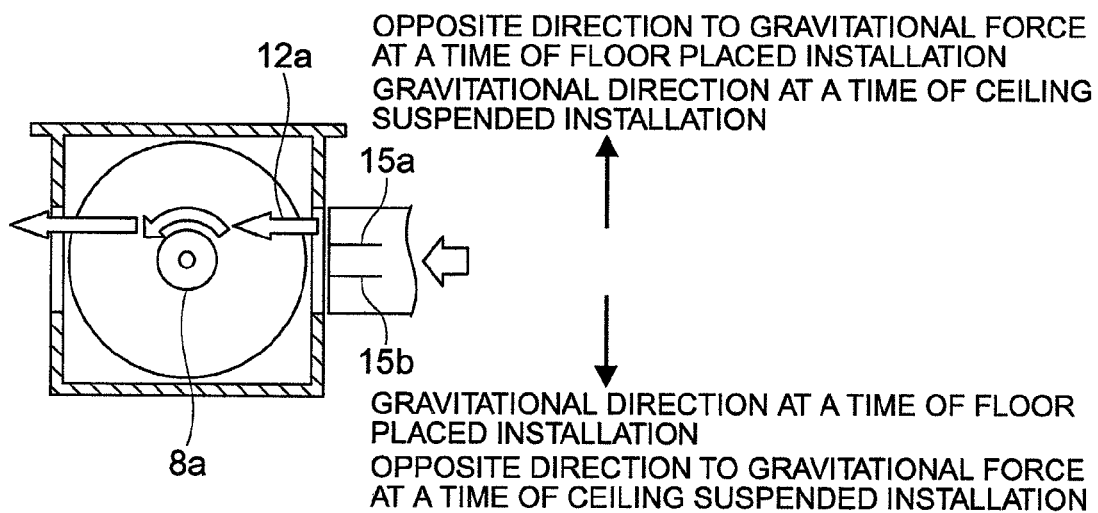
FIG. 5B is a front elevational schematic view of the lamp unit and shows the flow of the cooling wind passing through the flow path in the upper stage, in the embodiments 1, 2 and 3.

FIG. 5B is a front elevational schematic view of the lamp unit and shows a flow of the cooling wind passing through the flow path in the upper stage. The cooling wind 12a is applied to the opposite direction side to the gravitational force of the light emitting portion 8a in the floor placed installation state (the gravitational direction side in the ceiling suspended installation state), and is discharged from the opening portion 14b after cooling the discharge lamp.

Figure 5C:
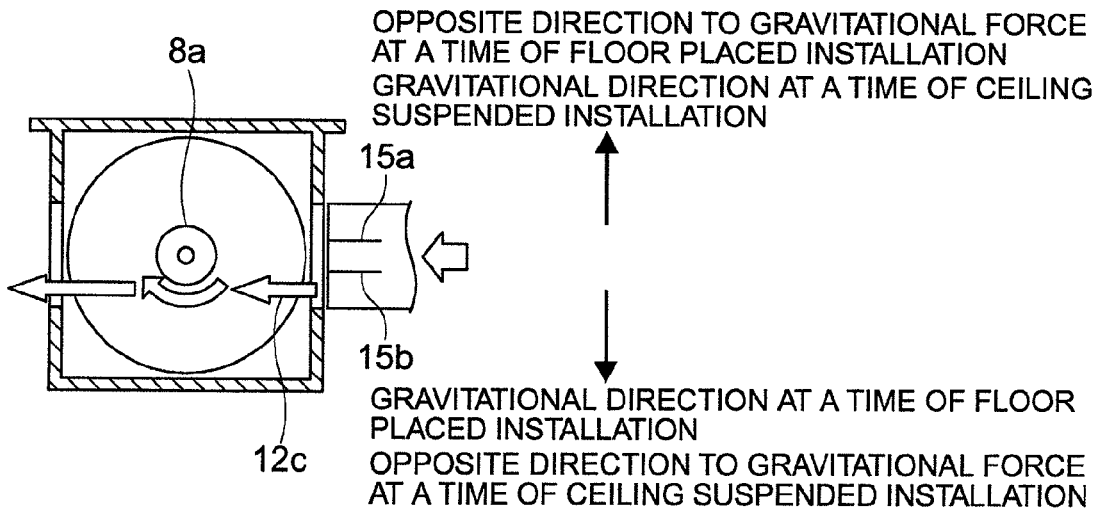
FIG. 5C is a front elevational schematic view of the lamp unit and shows the flow of the cooling wind passing through the flow path in the lower stage, in the embodiments 1, 2 and 3.

FIG. 5C is a front elevational schematic view of the lamp unit and shows the flow of the cooling wind passing through the flow path in the lower stage. The cooling wind 12c is applied to the gravitational direction side of the light emitting portion 8a in the floor placed installation state (the opposite direction side to the gravitational force in the ceiling suspended installation state), and is discharged from the opening portion 14b after cooling the discharge lamp.

In this case, FIG. 5A is a horizontal cross sectional schematic view of the lamp unit and shows the cooling wind passing through the flow path in the upper stage and the cooling wind passing through the flow path in the lower stage. Viewing the flow of the cooling wind shown in FIGS. 5B and 5C in the gravitational direction from the opposite direction to the gravitational force at a time of the floor placed installation, it becomes as shown in FIG. 5A. As shown in FIG. 5A, the cooling wind passing through the flow path in the upper stage and the cooling wind passing through the lower stage are directed to the light emitting portion 8a.

Figure 6A:
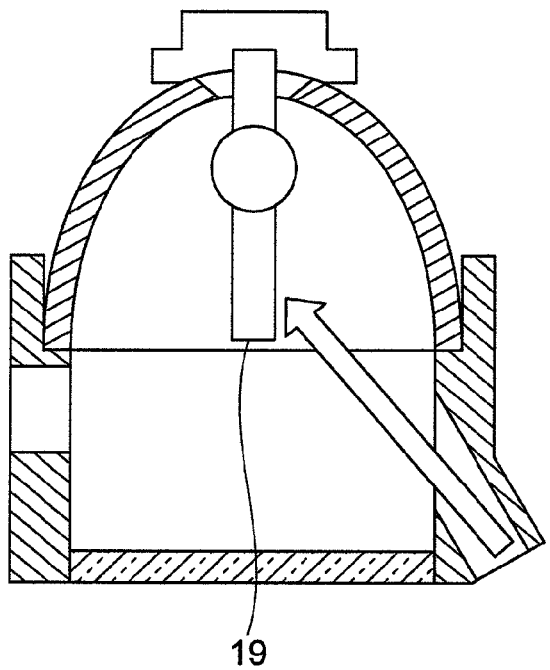
FIG. 6A is a horizontal cross sectional schematic view of the lamp unit and shows a flow of a cooling wind passing through a flow path in a middle stage, in the embodiments 1, 2 and 3.
Figure 6B:
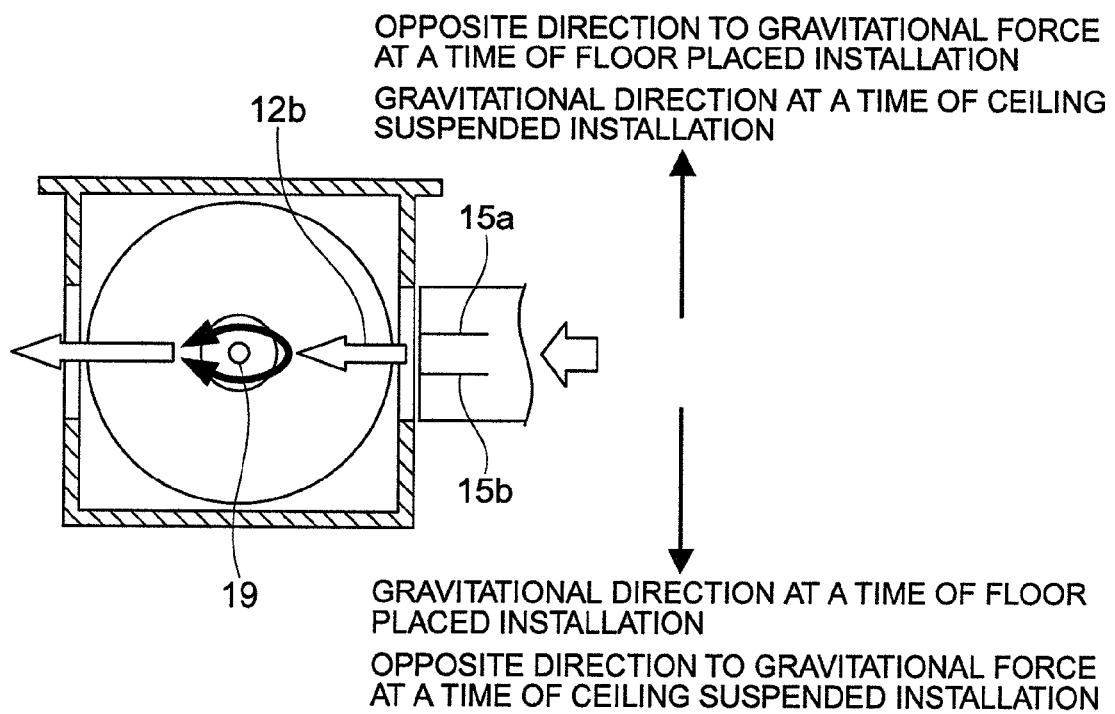
FIG. 6B is a front elevational schematic view of the lamp unit and shows the flow of the cooling wind passing through the flow path in the middle stage, in the embodiments 1, 2 and 3.

FIG. 6B is a front elevational schematic view of the lamp unit and shows the flow of the cooling wind passing through the flow path in the middle stage. The cooling wind 12b is discharged from the opening portion 14b after cooling a sealed portion 19.

In this case, FIG. 6A is a horizontal cross sectional schematic view of the lamp unit and shows the flow of the cooling wind passing through the flow path in the middle stage. Viewing the flow of the cooling wind shown in FIG. 6B in the gravitational direction from the opposite direction to the gravitational force at a time of the floor placed installation, it becomes as shown in FIG. 6A. As shown in FIG. 6A, the cooling wind passing through the flow path in the middle stage is directed to the sealed portion 19.

It is possible to appropriately deliver the cooling wind to the portion to be cooled by dividing the flow path into three sections as mentioned above.

Further, a gas amount of the cooling wind cooling the opposite direction side to the gravitational force in the light emitting portion of the lamp is increased by structuring such that more cooling wind passes through two flow paths in the opposite direction side to the gravitational force relatively in comparison with one flow path in the gravitational direction side, by means of the movable type rectification plate 17.

An efficiency of cooling the lamp is improved by rectifying the cooling wind by using the fixed rectification plates 15a and 15b and the movable type rectification plate 17.

FIG. 7 is a view showing a state of the case that the projection type display apparatus in accordance with the present embodiment is installed in accordance with the ceiling suspended installation.

In the case of the floor placed installation, since it is often the case that the projection type display apparatus projects upward diagonally, the light is projected toward the ceiling if it is attached to the ceiling without changing the direction. Accordingly, in the case of the ceiling suspended installation, it is necessary to install the projection type display apparatus by vertically inversing to the case of the floor placed installation. Then, since the discharge lamp 8 itself becomes inverse vertically to the projection type display apparatus, a portion coming to a high temperature is different from the case of the floor placed installation. At this time, on the assumption that a general lamp duct is used, even if it is possible to concentrically cool the opposite direction side to the gravitational force in one installed state, it is hard to concentrically cool the opposite direction side to the gravitational force in the other installed state. In other words, it is hard to concentrically cool the opposite direction side to the gravitational force in both the installed states mentioned above.

In the case of the ceiling suspended installation, the lamp fixing casing 13 and the lamp duct 7 become inverse vertically in comparison with the floor placed installation, however, in accordance with the structure of the present embodiment, the movable type rectification plate 17 rotates around the support shaft 16 on the basis of its own weight. Accordingly, in the same manner as the floor placed installation, more cooling wind passes through two flow paths in the opposite direction to the gravitational force relatively in comparison with one flow path in the gravitational direction. An effect thereof is the same as that of the floor placed installation case.

In other words, in accordance with the structure of the present embodiment, since the movable type rectification plate 17 is positioned at an end in the gravitational direction of a movable range in any installation state on the basis of a movement caused by its own weight, it is possible to concentrically cool the opposite direction side to the gravitational force of the light emitting portion of the lamp in any installed state.

A description will be given of the movable type rectification plate 17 in accordance with the present embodiment with reference to FIG. 8.

During an operation of the projection type display apparatus, a gravitational force m and a pressure F of the cooling wind are applied to the movable type rectification plate 17. When the installing direction is changed from the floor placed installation to the ceiling suspended installation, a state in FIG. 8 is formed, and the gravitational force m and the pressure F of the cooling wind are applied in the opposite direction.

On the assumption that θ is set to an angle of the movable type rectification plate 17 with respect to a horizontal direction, and mv is set to a component of the gravitational force which is vertical to the rectification plate, the following relationship is established.

$$mv = m \cdot \cos \theta$$

On the assumption that L is set to a distance from the support shaft 16 of the movable type rectification plate 17 to a gravity point, a moment Mm generated by the gravitational force around the support shaft, and a moment Mf generated by the cooling wind are determined on the basis of the following expression.

$$Mm = m \cdot \cos \theta \cdot L$$

$$Mf = f(Fv)$$

In this case, f(Fv) is caused by an opening shape of the movable type rectification plate 17.

Accordingly, if a condition Mm>Mf, that is, $m \cdot \cos \theta \cdot L > f(Fv)$ is satisfied, the movable type rectification plate 17 rotates in the gravitational direction on the basis of its own weight in any installation state of the floor placed installation and the ceiling suspended installation. Therefore, it is desirable that a material of the movable type rectification plate 17 is set to a material having a high specific gravity so that the moment Mm becomes sufficiently great.

The pressure Fv of the cooling wind is changed in accordance with a fan rotating speed of the projection type display apparatus, however, becomes different values in accordance with a cooling mechanism or a cooling condition such as a calorific power of the projection type display apparatus, a gas amount to be required, or the like.

In this case, the movable type rectification plate 17 should be supported by the support shaft 16 which does not pass through the gravity point of the movable type rectification plate. In the case that the support shaft 16 passes through the gravity point of the movable type rectification plate, a distance L from the support shaft to the gravity point equals to 0, and the moment Mm caused by the gravitational force is not generated, it does not rotate on the basis of its own weight.

Further, it is desirable that the movable type rectification plate 17 comes into contact with the wall surface of the lamp duct 7 as shown in FIGS. 4A and 7 after rotating, and is retained by the wall surface and the support shaft 16. This is because it swings due to a wind pressure of the cooling wind. Alternatively, it may be retained by a fixed rectification plate 15a or 15b and the support shaft 16, in place of the wall surface.

Further, it is desirable that the angle θ of the movable type rectification plate 17 with respect to the horizontal direction is less than 90 degree, and is not close to 90 degree. In the case that the angle θ is equal to or more than 90 degree or close to 90 degree, if the movable type rectification plate 17 is contracted or expanded due to a change of an environmental temperature, the movable type rectification plate 17 is jammed between the support shaft 16 and the wall surface of the lamp duct 7, and does not rotate at a high possibility. Accordingly, it is desirable to make a length from the support shaft of the movable type rectification plate 17 to the wall surface side end longer than a half of a length from the support shaft 16 to the wall surface of the lamp duct 7, that is, a length in a vertical direction of a cross section of the lamp duct 7, thereby preventing the movable type rectification plate 17 from being jammed by tilting. Alternatively, in the case that the movable type rectification plate 17 is retained by the fixed rectification plate 15a or 15b and the support shaft 16, in place of the wall surface, the movable type rectification plate 17 should be retained in a tilted manner by elongating the length of the fixed rectification plates 15a and 15b to a downstream side than the support shaft, or installing the support shaft 16 between the fixed rectification plates 15a and 15b.

Further, it is desirable that the movable type rectification plate 17 is tilted to a direction coming into contact with the wall surface of the lamp duct 7 in an upstream side than the support shaft 16. If it is tilted to the direction coming into contact with the wall surface of the lamp duct 7 in a downstream side, a case of floating up by the moment Mf caused by the cooling wind can be thought. Further, in the case that the movable type rectification plate 17 is retained by the fixed rectification plate 15a or 15b and the support shaft 16, in place of the wall surface, the movable type rectification plate 17 should be tilted to the same direction as mentioned above and retained by elongating the length of the fixed rectification plates 15a and 15b to the downstream side than the support shaft, or installing the support shaft 16 between the fixed rectification plates 15a and 15b, in such a manner that the fixed rectification plates 15a and 15b and the movable type rectification plate 17 can come into contact with each other.

Further, it is possible to secure a flow path area which is equal to or more than one half of a cross sectional area of the lamp duct 7 while maintaining the gas amount changeable function of each of the flow paths, even in the case that the projection type display apparatus is inverse vertically, by setting a hole or a notch (hereinafter, refer to as an opening portion 18) in the support shaft side of the movable type rectification plate 17.

It is possible to guide the cooling wind to the opposite direction side to the gravitational force in the light emitting portion 8a of the lamp in any installed state of the floor placed installation and the ceiling suspended installation of the projection type display apparatus, by means of the movable type rectification plate 17.

In this case, in the present embodiment, when the movable type rectification plate 17 is retained, the fixed rectification plates 15a and 15b and the movable type rectification plate 17 are set to a contact state or an extremely small distance, and the wall surface of the lamp duct 7 and the movable type rectification plate 17 are set to a contact state or an extremely small distance. Accordingly, it is possible to approximately seal one flow path in the gravitational direction in the three divided flow paths, by the fixed rectification plate 15a or 15b and the movable type rectification plate 17. In this case, it is possible to pass more cooling wind through two flow paths in the opposite direction side to the gravitational force in comparison with the case that one flow path in the gravitational direction side is not sealed.

In this case, in the present embodiment, since the cooling efficiency of the lamp is improved as far as the movable type rectification plate 17 is provided, the fixed rectification plates 15a and 15b may be omitted.

In this case, in the present embodiment, there is shown the embodiment in which the flow path of the cooling wind is divided into three sections by the fixed rectification plates 15a and 15b, however, may be divided into two sections or may be divided into four or more.

In accordance with the present embodiment, since the rectification plate is provided within the lamp duct 7, it is possible to easily carry out a maintenance of the discharge lamp by constructing the lamp casing by a simple structure. Further, whichever installation state of the floor placed installation and the ceiling suspended installation the installation state of the projection type display apparatus is, it is possible to blow the cooling wind to the opposite direction side to the gravitational force in the light emitting portion of the lamp by the movable type rectification plate 17, and it is possible to preferably keep the temperature of the discharge lamp. Accordingly, it is possible to enhance a reliability and a safety of the discharge lamp, and it is possible to achieve a long service life. In other words, it is possible to more preferably cool the light source of the projection type display apparatus.

Embodiment 2

In the embodiment 1, the description is given of the projection type display apparatus provided with the movable type rectification plate 17 employing the material having the high specific gravity, for increasing the moment generated by the gravitational force around the support shaft, with regard to the movable type rectification plate 17 rotating around the support shaft on the basis of its own weight.

In the present embodiment, a description will be given of an embodiment which can increase a moment in place of simply increasing the specific gravity of the material, with regard to the movable type rectification plate rotating around the support shaft on the basis of its own weight, in the same manner as the embodiment 1.

In this case, a projection type display apparatus in accordance with the present embodiment is obtained by substituting a movable type rectification plate in accordance with the present embodiment for the movable type rectification plate 17 in the embodiment 1, and since the other structures and motions are the same as the structures and motions of the projection type display apparatus in the embodiment 1, a description of the other elements than the movable type rectification plate will be omitted.

A sufficient moment Mm can be obtained, for example, by increasing a thickness of a portion in an opposite direction to the support shaft of the movable type rectification plate (hereinafter, refer simply to as a rectification plate lower portion 21). Accordingly, the gravity point of the movable type rectification plate is away from the support shaft, the distance L from the support shaft to the gravity point becomes large, and the moment Mm is increased. Therefore, the movable type rectification plate shown below is used in the present embodiment.

Figure 10A:
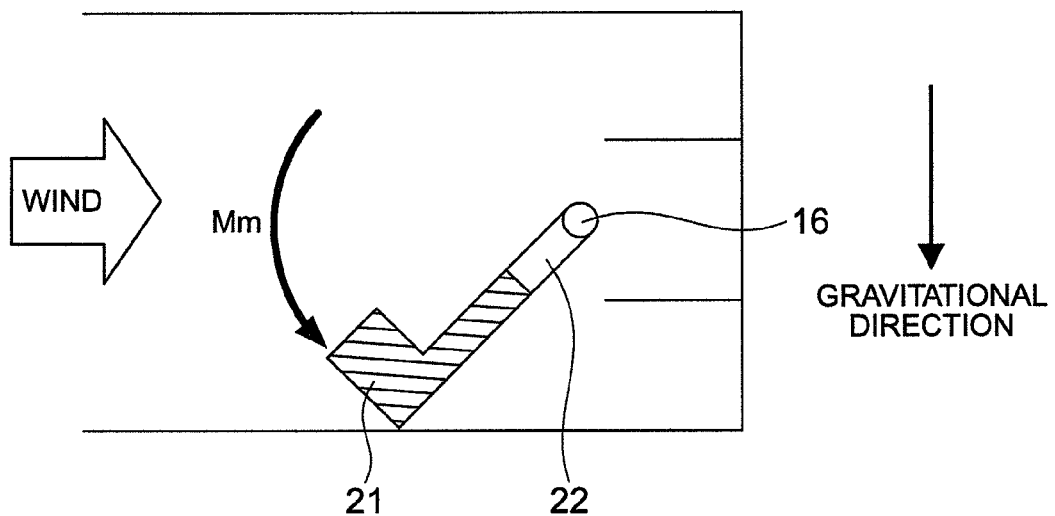
FIG. 10A is an explanatory view of the movable type rectification plate in accordance with the embodiment 2.

(1) As shown in FIG. 10A, there is used the rectification plate formed such that the rectification plate lower portion 21 is thicker than a portion in a support shaft direction (hereinafter, refer simply to as a rectification plate upper portion 22) of the movable type rectification plate. In this case, a necessary moment Mm can be obtained even by employing a lighter material than that of the movable type rectification plate 17 in the embodiment 1.

In this case, the embodiment demands more material than the embodiment 1 at a volume in accordance with the rectification plate lower portion 21, however, a lower cost can be achieved in some kind of material to be employed.

Figure 10B:
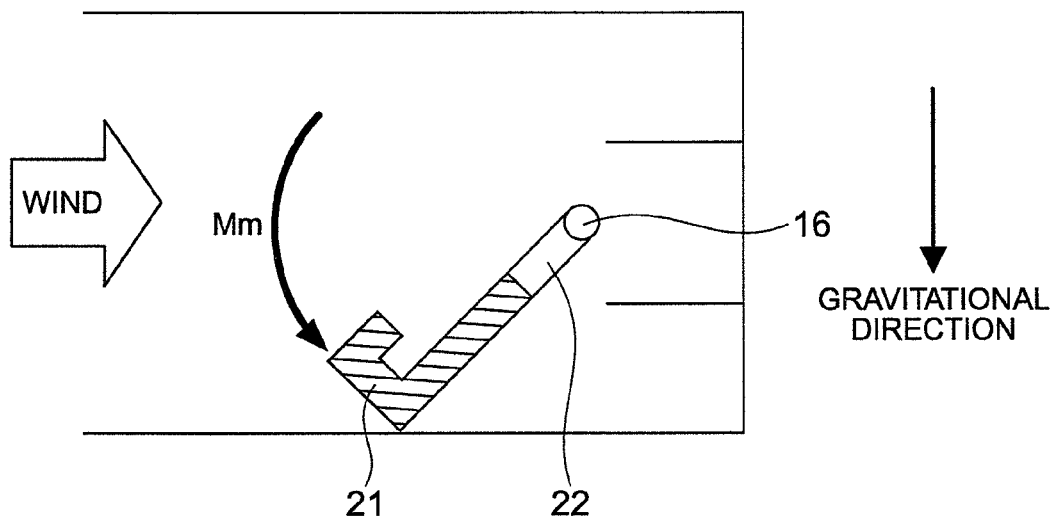
FIG. 10B is an explanatory view of the movable type rectification plate in accordance with the embodiment 2.

(2) As shown in FIG. 10B, the rectification plate lower portion 21 is folded back toward the support shaft 16. In the case of folding back the rectification plate lower portion 21, a thickness of the fold-back portion is increased, and a necessary moment Mm can be obtained even by employing a lighter material than that of the movable type rectification plate 17 in the embodiment 1.

In this case, the embodiment demands more material than the embodiment 1 at a volume in accordance with the fold-back portion, however, a lower cost can be achieved in some kind of material to be employed.

Further, since a working of the movable type rectification plate can be achieved by a press molding and a bending work, a lower cost can be achieved in comparison with a manufacturing using a forming mold.

In addition to the items (1) and (2) mentioned above, a necessary moment Mm can be obtained by setting the material employed for the rectification plate lower portion 21 to a material having a greater specific gravity than that of the material employed for the rectification plate upper portion 22.

In accordance with the present embodiment, since the lighter material than that of the embodiment 1 can be employed, the kind of the material which can be employed for manufacturing the movable type rectification plate is increased in comparison with the embodiment 1. Accordingly, a lower cost can be achieved in some kind of the material to be employed. Further, in the case that the opening portion exists in the movable type rectification plate, a necessary moment Mm can be increased by using the other portions than the opening portion. Further, in conjunction with this, the same effect as that of the embodiment 1 can be obtained. In other words, it is possible to more preferably cool the light source of the projection type display apparatus.

Embodiment 3

In the embodiment 1 and the embodiment 2, the description is given of the projection type display apparatus provided with the movable type rectification plate 17 rotating around the support shaft 16 on the basis of its own weight.

In the present embodiment, a description will be given of a projection type display apparatus provided with a movable type rectification plate 20 sliding in the gravitational direction on the basis of its own weight.

In this case, the projection type display apparatus in accordance with the present embodiment is obtained by substituting the movable type rectification plate 20 for the movable type rectification plate 17 in the embodiment 1, and since the other structures and motions are the same as the structures and motions of the projection type display apparatus in the embodiment 1, a description of the other elements than the movable type rectification plate 20 will be omitted.

FIG. 9 is a view showing a structure of a cross section of the projection type display apparatus in accordance with the present embodiment.

As is described in the embodiment 1, the blow port of the cooling wind in the lamp duct 7 is divided into three sections by the fixed rectification plates 15a and 15b. In the present embodiment, in order to change a flow rate of the cooling wind in correspondence to the position in the vertical direction within the flow path of the cooling wind, there is provided the movable type rectification plate 20 which is installed in an upstream side of the fixed rectification plates 15a and 15b, and is slidably supported. The movable type rectification plate 20 is structured such as to slide in the gravitational direction on the basis of its own weight.

Figure 9A:
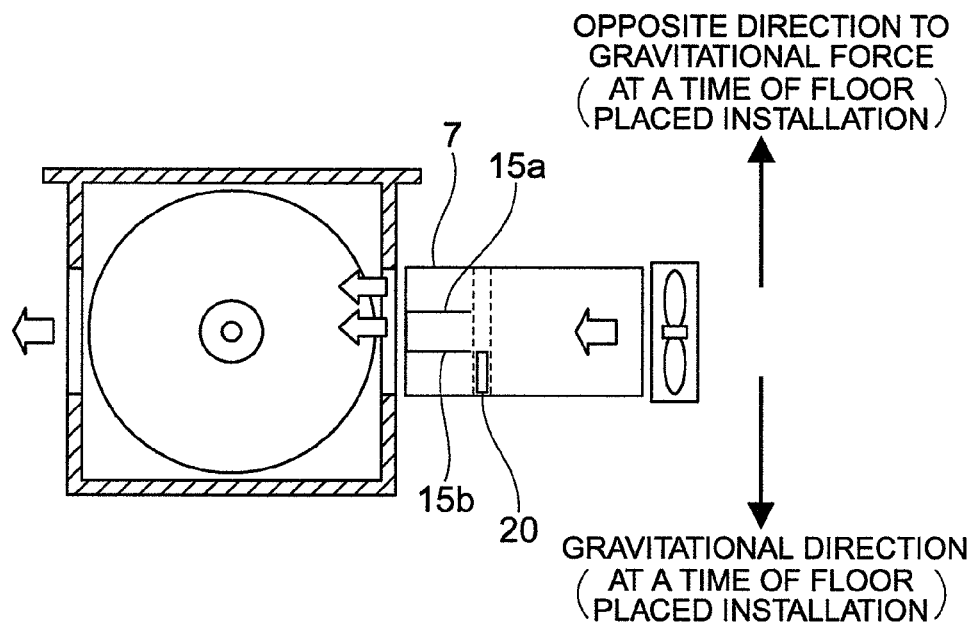
FIG. 9A is a schematic view of a state in which the projection type display apparatus in accordance with the embodiment 3 is placed in accordance with a floor placed installation.

In a floor placed installation state in FIG. 9A, the movable type rectification plate 20 is at a position shutting off the flow path in the gravitational direction side on the basis of its own weight. The gas amount of the cooling wind cooling the opposite direction side to the gravitational force in the light emitting portion of the lamp is increased by structuring such that more cooling wind is guided into the lamp fixing casing 13 from two flow paths in the opposite direction side to the gravitational force relatively in comparison with one flow path in the gravitational direction side. Accordingly, the opposite direction side to the gravitational force of the light emitting portion of the lamp is concentrically cooled.

Figure 9B:
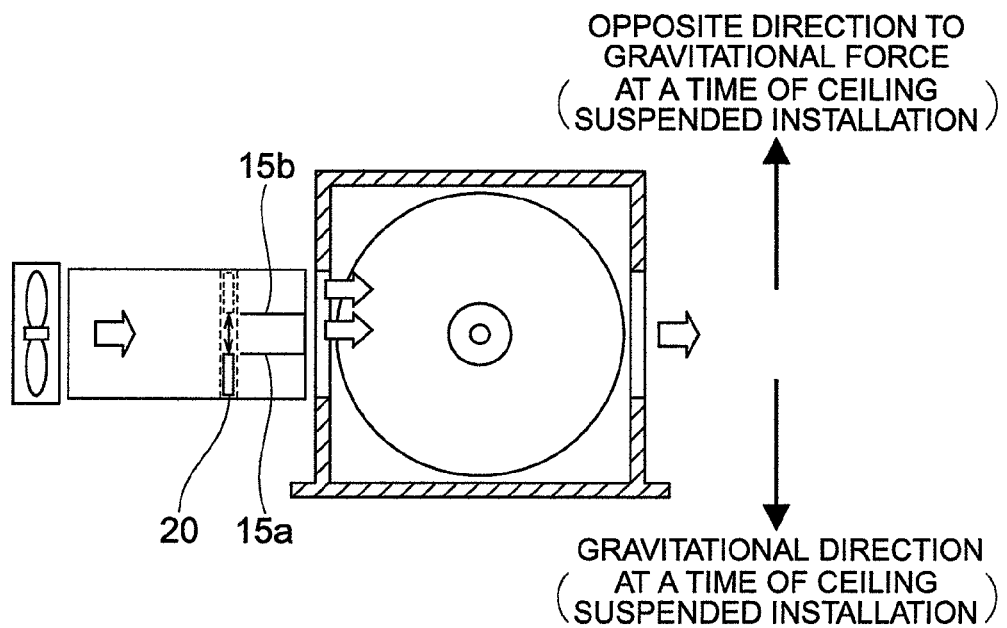
FIG. 9B is a schematic view of a state in which the projection type display apparatus in accordance with the embodiment 3 is suspended in accordance with a ceiling suspended installation.

In a ceiling suspended installation state in FIG. 9B, since the movable type rectification plate 20 is slidably supported in spite that the direction of the lamp fixing casing 13 and the lamp duct 7 is vertically inverse to the floor placed installation state, the movable type rectification plate 20 moves to a position shutting off the flow path in the gravitational direction side on the basis of its own weight. Accordingly, more cooling wind can be guided into the lamp fixing casing 13 from two flow paths in the opposite direction side to the gravitational force relatively in comparison with one flow path in the gravitational direction side, in the same manner as the floor placed installation, and the gas amount of the cooling wind cooling the opposite direction side to the gravitational force of the light emitting portion of the lamp is increased. Therefore, it is possible to cool in the same condition as that of the floor placed installation case.

In this case, in the present embodiment, it is possible to approximately seal one flow path in the gravitational direction side in three divided flow paths, by structuring such that the movable type rectification plate 20 and the fixed rectification plate 15a or 15b come into contact with each other. In this case, it is possible to allow more cooling wind to pass through two flow paths in the opposite direction side to the gravitational force in comparison with the case that one flow path in the gravitational direction side is not sealed.

In this case, in the present embodiment, since the cooling efficiency of the lamp is improved as far as the movable type rectification plate 20 is provided, the fixed rectification plates 15a and 15b may be omitted.

Further, in the present embodiment, there is shown the embodiment in which the flow path of the cooling wind is divided into three sections by the fixed rectification plates 15a and 15b, however, may be divided into two sections or may be divided into four or more.

In accordance with the present embodiment, it is possible to reduce a space demanded by the movable type rectification plate in the lamp duct 7 (particularly a space in the wind guiding direction of the cooling wind) demanded by the movable type rectification plate in the lamp duct 7, in comparison with the embodiment 1 and the embodiment 2. Accordingly, even in the case that the lamp duct 7 is short and the movable type rectification plates 17 and 20 can not be installed, the same effects as those of the embodiment 1 and the embodiment 2 can be obtained. In other words, it is possible to preferably cool the light source of the projection type display apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type display apparatus comprising:
a lamp unit including a light source;
a cooling fan cooling said light source; and
a single cooling wind guide tube guiding a cooling wind generated by said cooling fan to said lamp unit,
wherein said cooling wind guide tube has a movable type rectification plate which is movable by its own weight, and three divided flow paths, one of the three divided flow paths is central one between the remainder two ones of the three divided flow paths to enable the cooling wind to be directed toward a sealing portion of the light source, the remainder two ones of the three divided flow paths are opposed to each other through the one of the three divided flow paths in the gravitational direction to enable the cooling wind to be directed toward a light emitting portion of the light source, and the movable type rectification plate is movable by its own weight to guide the cooling wind toward the one of the three divided flow paths and toward any one of the remainder two ones of the three divided flow paths.

2. A projection type display apparatus as claimed in claim 1,
wherein said cooling wind guide tube has a movable type rectification plate which is movable by its own weight, and
wherein said movable type rectification plate is rotatable by its own weight around a support shaft which does not pass through a gravity point of said movable type rectification plate, and has one of a hole and a notch in the vicinity of the support shaft to enable the cooling wind to pass through the one of the hole and the notch when the movable type rectification plate rotates to switch a flow direction of the cooling wind.

3. A projection type display apparatus as claimed in claim 2, wherein said movable type rectification plate is retained by said support shaft and a wall surface of said cooling wind guide tube after rotating by its own weight.

4. A projection type display apparatus as claimed in claim 1, wherein said movable type rectification plate is structured such that a specific gravity of a material constructing a portion which is away from said support shaft is larger than a specific gravity of a material constructing a portion which is close to said support shaft.

5. A projection type display apparatus as claimed in claim 1, wherein said cooling wind guide tube includes cooling wind guide tubes to divide a flow path of the cooling wind into three divided flow paths, said movable type rectification plate is supported in such a manner as to be slidable in a gravitational direction by its own weight to restrain the cooling wind from being directed toward lowermost one of the three divided flow paths in the gravitational direction.

6. A projection type display apparatus comprising:
a lamp unit including a light source;
a cooling fan cooling said light source; and
a cooling wind guide tube guiding a cooling wind generated by said cooling fan to said lamp unit to guide the cooling wind,
wherein said cooling wind guide tube has a movable type rectification plate which is movable by its own weight, and
wherein said movable type rectification plate is rotatable by its own weight around a support shaft which does not pass through a gravity point of said movable type rectification plate, and has one of a hole and a notch in the vicinity of the support shaft to enable the cooling wind to pass through the one of the hole and the notch when the movable type rectification plate rotates to switch a flow direction of the cooling wind, wherein said movable type rectification plate comes into contact with a wall surface of said cooling wind guide tube in an upstream side of said support shaft, after rotating by its own weight.

7. A projection type display apparatus comprising:
a lamp unit including a light source;
a cooling fan cooling said light source; and
a cooling wind guide tube guiding a cooling wind generated by said cooling fan to said lamp unit to guide the cooling wind,
wherein said cooling wind guide tube has a movable type rectification plate which is movable by its own weight, and
wherein said movable type rectification plate is rotatable by its own weight around a support shaft which does not pass through a gravity point of said movable type rectification plate, and has one of a hole and a notch in the vicinity of the support shaft to enable the cooling wind to pass through the one of the hole and the notch when the movable type rectification plate rotates to switch a flow direction of the cooling wind,
wherein said cooling wind guide tube has a fixed rectification plate dividing a flow path of said cooling wind, and said fixed rectification plate is installed in a downstream side of said movable type rectification plate.

8. A projection type display apparatus comprising:
a lamp unit including a light source;
a cooling fan cooling said light source; and
a cooling wind guide tube guiding a cooling wind generated by said cooling fan to said lamp unit to guide the cooling wind,
wherein said cooling wind guide tube has a movable type rectification plate which is movable by its own weight, and
wherein said movable type rectification plate is rotatable by its own weight around a support shaft which does not pass through a gravity point of said movable type rectification plate, and has one of a hole and a notch in the vicinity of the support shaft to enable the cooling wind to pass through the one of the hole and the notch when the movable type rectification plate rotates to switch a flow direction of the cooling wind,
wherein said movable type rectification plate is structured such that a portion which is away from said support shaft is folded back toward said support shaft.

9. A projection type display apparatus comprising:
a lamp unit including a light source;
a cooling fan cooling said light source; and
a cooling wind guide tube guiding a cooling wind generated by said cooling fan to said lamp unit to guide the cooling wind,
wherein said cooling wind guide tube has a movable type rectification plate which is movable by its own weight, and
wherein said movable type rectification plate is rotatable by its own weight around a support shaft which does not pass through a gravity point of said movable type rectification plate, and has one of a hole and a notch in the vicinity of the support shaft to enable the cooling wind to pass through the one of the hole and the notch when the movable type rectification plate rotates to switch a flow direction of the cooling wind,
wherein said movable type rectification plate is structured such that a portion which is away from said support shaft is thicker than a portion which is close to said support shaft.

10. A projection type display apparatus as claimed in claim 7, wherein said fixed rectification plate is constructed by a rectification plate dividing the flow path of said cooling wind into three sections including an upper stage, a middle stage and a lower stage, and a gas volume of the cooling wind passing through two flow paths in an opposite direction side to a gravitational force is relatively more than a gas amount of the cooling wind passing through one flow path in a gravitational direction, in the flow paths divided by said fixed rectification plate.

* * * * *